(12) United States Patent
Speranza et al.

(10) Patent No.: US 7,314,509 B2
(45) Date of Patent: Jan. 1, 2008

(54) GAS LIQUID PHASE SEPARATOR WITH IMPROVED PRESSURE CONTROL

(75) Inventors: A. John Speranza, West Hartford, CT (US); Andrzej E. Stanek, New Britain, CT (US); Angelo A. Morson, South Windsor, CT (US); Justin D. Baltrucki, Marlborough, CT (US)

(73) Assignee: Proton Energy System, Inc., Wallingford, CT (US)

( * ) Notice: Subject to any disclaimer, the term of this patent is extended or adjusted under 35 U.S.C. 154(b) by 157 days.

(21) Appl. No.: 10/900,623

(22) Filed: Jul. 28, 2004

(65) Prior Publication Data
US 2005/0000800 A1 Jan. 6, 2005

Related U.S. Application Data

(62) Division of application No. 10/132,909, filed on Apr. 24, 2002, now Pat. No. 6,814,841.

(51) Int. Cl.
*B01D 17/32* (2006.01)

(52) U.S. Cl. ............... 96/155; 55/423; 95/19; 95/20; 95/24; 96/408; 96/409; 96/410; 96/411; 96/412; 96/253; 96/157; 96/161; 96/168; 96/169; 96/174; 210/104; 210/114; 210/115; 210/123; 210/428; 210/539; 210/741; 210/744; 137/172; 137/192; 137/203; 137/558

(58) Field of Classification Search ............... 96/158, 96/165, 168, 189, 219, 247, 250, 155; 137/397, 137/411, 423, 172, 192, 203, 558; 204/266, 204/278; 210/104, 114, 115, 123, 428, 539, 210/741, 744; 55/423; 95/19, 20, 24, 155, 95/157, 408–412, 253, 161, 168, 169, 174
See application file for complete search history.

(56) References Cited

U.S. PATENT DOCUMENTS

| | | | | |
|---|---|---|---|---|
| 3,768,234 A | * | 10/1973 | Hardison | ............... 96/253 |
| 3,862,624 A | | 1/1975 | Underwood | |
| 4,355,652 A | * | 10/1982 | Perkins | ............... 137/15.04 |
| 4,950,371 A | | 8/1990 | McElroy | |
| 5,037,518 A | | 8/1991 | Young et al. | |
| 5,389,264 A | | 2/1995 | Lehmann et al. | |
| 5,402,645 A | | 4/1995 | Johnson et al. | |
| 5,632,802 A | * | 5/1997 | Grgich et al. | ............... 95/10 |
| 5,667,647 A | * | 9/1997 | Suga et al. | ............... 204/237 |
| 5,935,427 A | * | 8/1999 | Witter et al. | ............... 210/93 |
| 6,056,806 A | | 5/2000 | Youssef | |

(Continued)

FOREIGN PATENT DOCUMENTS

| | | |
|---|---|---|
| WO | WO 98/42617 | 10/1998 |
| WO | WO 01/06038 A1 | 1/2001 |

*Primary Examiner*—Duane Smith
*Assistant Examiner*—Minh-Chau T. Pham
(74) *Attorney, Agent, or Firm*—Cantor Colburn LLP

(57) ABSTRACT

A gas/liquid phase separator includes a fluid inlet, a vapor outlet, a liquid outlet, and first and second valves disposed in fluid communication with the liquid outlet. Both valves are controllable in response to a fluid level in the gas/liquid phase separator. Both valves are further disposed in parallel fluid communication with each other. A method of controlling a liquid level in the phase separator includes sensing an amount of liquid in the phase separator, sensing a system pressure, and selectively opening a valve disposed in fluid communication with the phase separator to drain the liquid.

19 Claims, 4 Drawing Sheets

U.S. PATENT DOCUMENTS

| | | | |
|---|---|---|---|
| 6,056,873 A * | 5/2000 | Hartley et al. | 210/90 |
| 6,146,518 A * | 11/2000 | Fairlie et al. | 205/335 |
| 6,179,986 B1 | 1/2001 | Swette et al. | |
| 6,309,521 B1 | 10/2001 | Andrews et al. | |
| 6,383,361 B1 | 5/2002 | Moulthrop, Jr. et al. | |
| 6,413,297 B1 * | 7/2002 | Morgan et al. | 95/22 |
| 6,461,487 B1 | 10/2002 | Andrews et al. | |
| 6,712,944 B2 * | 3/2004 | Byron et al. | 204/266 |
| 6,814,841 B2 * | 11/2004 | Speranza et al. | 204/258 |
| 2004/0099614 A1 * | 5/2004 | Lehmann et al. | 210/787 |
| 2005/0045041 A1 * | 3/2005 | Hechinger et al. | 96/121 |
| 2005/0109703 A1 * | 5/2005 | Newenhizen | 210/739 |

\* cited by examiner

GAS LIQUID PHASE SEPARATOR WITH IMPROVED PRESSURE CONTROL

CROSS REFERENCE TO RELATED APPLICATIONS

This application is a divisional of U.S. patent application Ser. No. 10/132,909 filed Apr. 24, 2002 now U.S. Pat. No. 6,814,841, the entire content of which is incorporated herein by reference.

BACKGROUND

This disclosure relates to electrochemical cell systems, and, more particularly, to a gas liquid phase separator in which at least two control valves provide drainage of the phase separator at corresponding flow rates.

Electrochemical cells are energy conversion devices, usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the prior art is shown generally at 10 and is hereinafter referred to as "cell 10." Reactant water 12 is fed into cell 10 at an oxygen electrode (anode) 14 to form oxygen gas 16, electrons, and hydrogen ions (protons) 15. The chemical reaction is facilitated by the positive terminal of a power source 18 connected to anode 14 and the negative terminal of power source 18 connected to a hydrogen electrode (cathode) 20. Oxygen gas 16 and a first portion 22 of the water are discharged from cell 10, while protons 15 and a second portion 24 of the water migrate across a proton exchange membrane 26 to cathode 20. At cathode 20, hydrogen gas 28 is removed, generally through a gas delivery line. The removed hydrogen gas 28 is usable in a myriad of different applications. Second portion 24 of water is also removed from cathode 20.

An electrolysis cell system may include a number of individual cells arranged in a stack with reactant water being directed through the cells via input and output conduits formed within the stack structure. The cells within the stack are sequentially arranged, and each one includes a membrane electrode assembly defined by a proton exchange membrane disposed between a cathode and an anode. The cathode, anode, or both may be gas diffusion electrodes that facilitate gas diffusion to the proton exchange membrane. Each membrane electrode assembly is in fluid communication with flow fields adjacent to the membrane electrode assembly, defined by structures configured to facilitate fluid movement and membrane hydration within each individual cell.

The portion of water discharged from the cathode side of the cell, which is entrained with hydrogen gas, is fed to a phase separator to separate the hydrogen gas from the water, thereby increasing the hydrogen gas yield and the overall efficiency of the cell in general. The removed hydrogen gas may be fed either to a dryer for removal of trace water, to a storage facility, e.g., a cylinder, a tank, or a similar type of containment vessel, or directly to an application for use as a fuel.

While existing electrolysis cell systems are suitable for their intended purposes, there still remains a need for improvements, particularly regarding the management of the separation of the hydrogen gas from the water. Furthermore, a need exists for improved control of the level of the water in the phase separator during the operation of the cell system.

BRIEF SUMMARY

The above-described drawbacks and disadvantages are alleviated by a gas/liquid phase separator for an electrochemical cell system in which the phase separator has improved pressure control capability. The phase separator includes a fluid inlet, a vapor outlet, a liquid outlet, and first and second valves disposed in fluid communication with the liquid outlet. Both valves are controllable in response to the liquid level in the phase separator. Both valves are further disposed in parallel flow configuration with each other.

A method of controlling a liquid level in the phase separator includes sensing an amount of liquid in the phase separator, sensing the hydrogen system pressure, and selectively opening a valve disposed in fluid communication with the phase separator to drain the liquid.

The above discussed and other features will be appreciated and understood by those skilled in the art from the following detailed description and drawings.

BRIEF DESCRIPTION OF THE DRAWINGS

Referring now to the drawings wherein like elements are numbered alike in several Figures.

DETAILED DESCRIPTION

Disclosed herein is a gas/liquid phase separator for an electrolysis cell system. The phase separator includes a system for managing the discharge rate of water from the phase separator. The system provides for the drainage of a gas/liquid phase separator through an arrangement of valves disposed in a parallel flow configuration with each other. Each valve accommodates a specific range of flow rates in order to provide for the drainage and the improved pressure stabilization of the separator. The specific ranges at which the valves operate provide a wide range of control of the system. Stabilization is effected through the enhanced control of the liquid drainage and maintenance of the liquid level in the separator.

Figure 2:
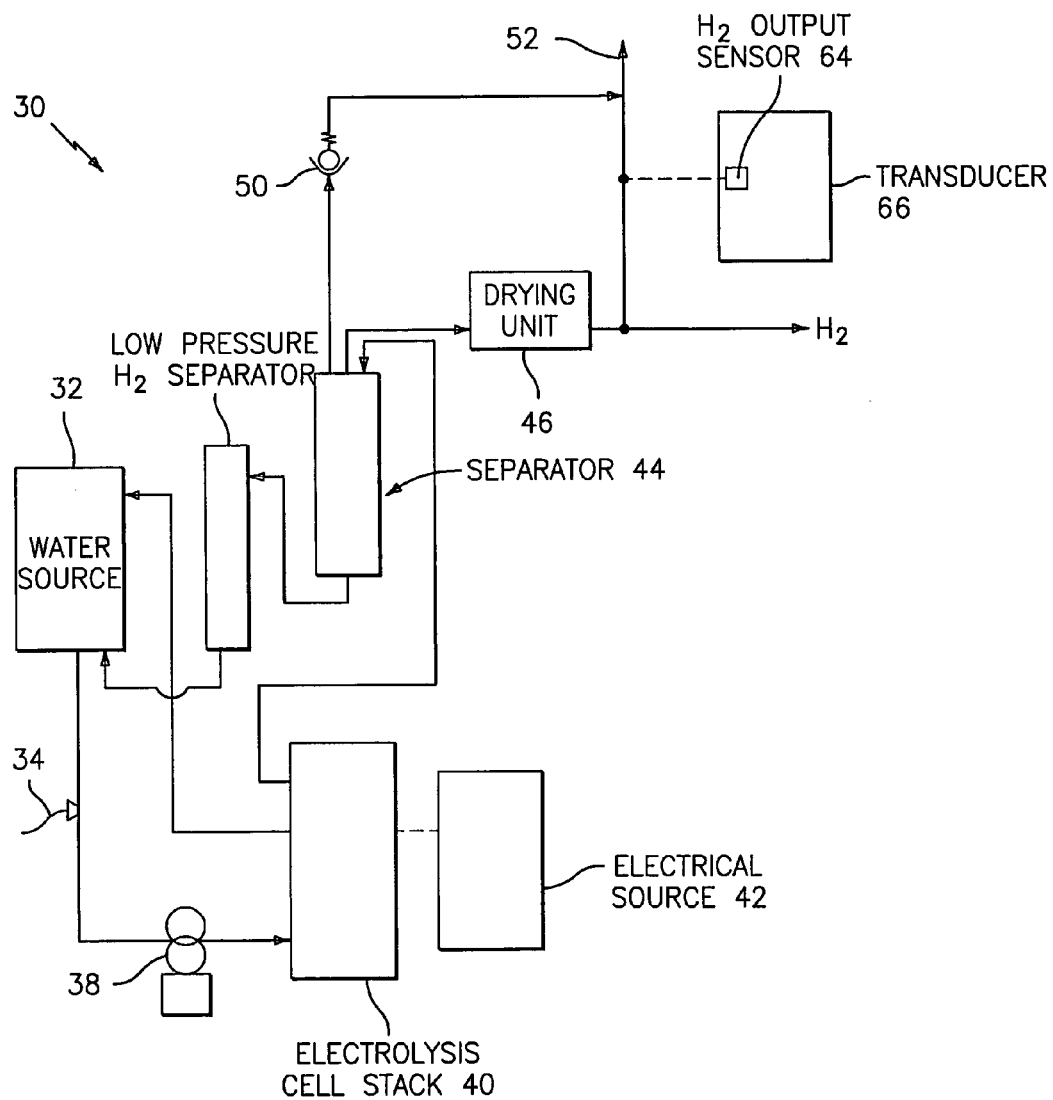
FIG. 2 is a schematic representation of an electrolysis cell system in which hydrogen gas can be generated.

Referring to FIG. 2, an exemplary embodiment of a hydrogen gas source is an electrolysis cell system, which is shown generally at 30 and is hereinafter referred to as "system 30." System 30 may be generally suitable for generating hydrogen for use as a fuel or for various other applications. While the improvements described below are described in relation to an electrolysis cell, the improvements are applicable to electrolysis cells, fuel cells, and the like, particularly regenerative fuel cells. Furthermore, although the description and figures are directed to the production of hydrogen and oxygen gas by the electrolysis of water, the apparatus is applicable to the generation of other gases from other reactant materials.

System 30 includes a water-fed electrolysis cell capable of generating hydrogen gas from reactant water. The reactant water utilized by system 30 is stored in a water source 32 and is fed by gravity or pumped through a pump 38 into an electrolysis cell stack 40. The supply line, which may be clear, plasticizer-free tubing, preferably comprises an electrical conductivity sensor 34 disposed in fluid communication therewith to monitor the electrical potential of the water, thereby determining its purity and ensuring its adequacy for use in system 30.

Figure 1:
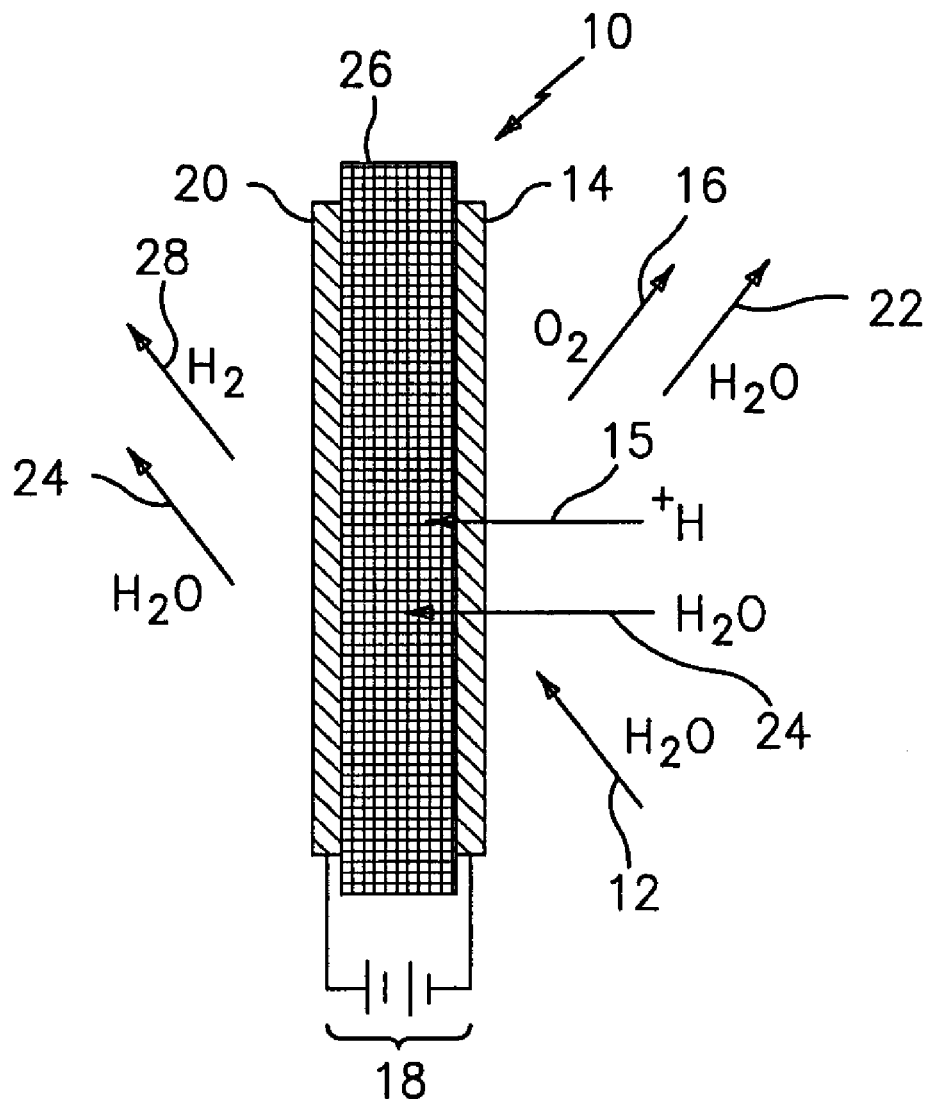
FIG. 1 is a schematic representation of an anode feed electrolysis cell of the prior art.

Cell stack 40 comprises a plurality of cells similar to cell 10 described above with reference to FIG. 1 that are encapsulated within sealed structures (not shown). The reactant water is received by manifolds or other types of conduits (not shown) that are in fluid communication with the cell components. An electrical source 42 is disposed in electrical communication with each cell within cell stack 40 to provide a driving force for the dissociation of the water. Electrical source 42 is operatively communicable with a cell control system (not shown) that controls the operation of system 30.

A hydrogen stream, which is entrained with water, exits cell stack 40 and is fed to a gas/liquid phase separation tank, which is a hydrogen/water separator 44 and is hereinafter referred to as "separator 44," where the gas and liquid phases are separated. The hydrogen gas exiting separator 44 is further dried at a drying unit 46, which may be, for example, a diffuser, a pressure swing absorber, desiccant, or the like. This wet hydrogen stream can have a pressure of about 1 pounds per square inch (psi) up to and exceeding about 20,000 psi. Preferably the hydrogen stream pressure is about 1 psi to about 10,000 psi with a pressure of about 100 psi to about 6,000 psi preferred, a pressure of about 1,500 psi to about 2,500 psi more preferred for some applications, and a pressure of about 100 psi to about 275 psi more preferred for other applications. The hydrogen from drying unit 46 is fed to a storage facility, as indicated above, or directly to an application, e.g., a refueling system, for use as a fuel.

Water with trace amounts of hydrogen entrained therein is returned to water source 32 from separator 44 through a low-pressure hydrogen separator 48. Separator 44 also includes a release 50, which may be a relief valve, to rapidly purge hydrogen to a hydrogen vent 52 when the pressure or pressure differential exceeds a pre-selected limit.

A hydrogen output sensor 64 is incorporated into system 30 to monitor the hydrogen pressure. Hydrogen output sensor 64 can be any suitable output sensor including, but not limited to, a flow rate sensor, a mass flow sensor, or any other quantitative sensing device such as a pressure transducer that converts the gas pressure within the hydrogen line to a voltage or current value for measurement. Hydrogen output sensor 64 is interfaced with a transducer 66, which is capable of converting the voltage or current value into a pressure reading. A display (not shown) may be disposed in operable communication with transducer 66 to provide a reading of the pressure, for example, at the location of hydrogen output sensor 64 on the hydrogen line. Transducer 66 is any suitable converting device, such as an analog circuit, a digital microprocessor, or the like, capable of converting a sensor signal into a displayable value.

Figure 3:
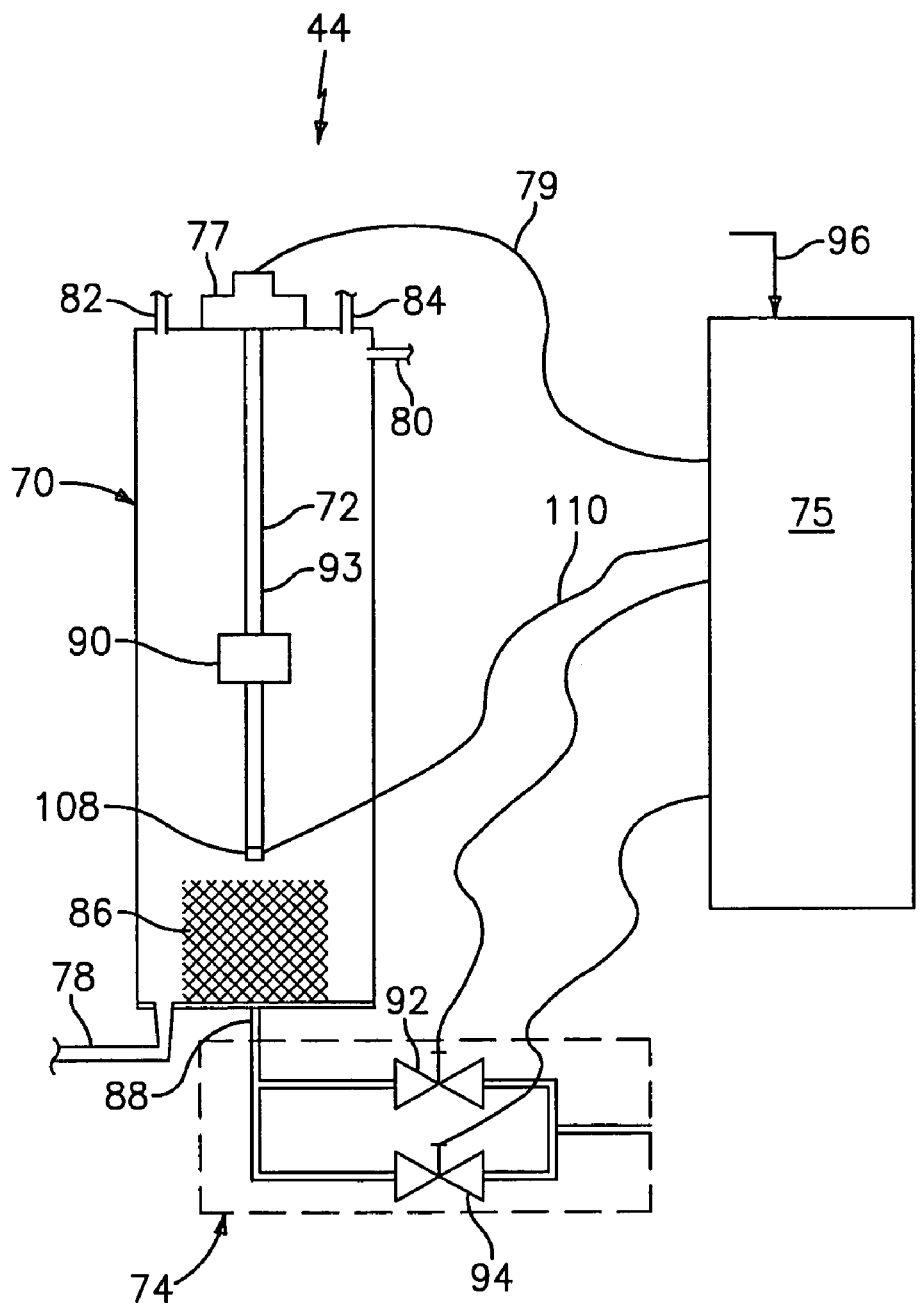
FIG. 3 is a schematic representation of a system having a gas/liquid phase separator and various valves disposed in fluid communication therewith.

Referring now to FIG. 3, a schematic representation of one exemplary embodiment of separator 44 is shown. Discharge rate of separator 44 is effected through a valve arrangement 74 maintained in controllable fluid communication with separator 44. The control of valve arrangement 74 is effected through a control device, which is preferably a transducer 75.

Separator 44, which is essentially a containment device configured to accommodate a continuous throughput, comprises a vessel 70 and a level sensing unit 72. Various materials from which separator 44 can be fabricated include metals, plastics, and combinations thereof that preferably allow separator 44 to receive the gas/liquid stream at the pressure it exits the cell stack. Pressures accommodated by separator 44, which are generally equal to or substantially equal to the operating pressure of the electrochemical cell system, can be up to and exceeding about 20,000 psi, with pressures of about 100 psi to about 6,000 psi being typical, pressures of about 1,500 psi to about 2,500 psi being preferred for some applications, and pressures of about 100 psi to about 275 psi being preferred for other applications. Metals that may be used to fabricate the various portions of separator 44 include, but are not limited to, ferrous materials (e.g., stainless steels and the like), titanium, nickel, and the like as well as oxides, composites, alloys and mixtures comprising at least one of the foregoing metals. Some possible plastics that may be used to fabricate the various portions of separator 44 include, but are not limited to, polycarbonates, polyethylenes, polypropylenes, and the like, as well as reaction products and mixtures comprising at least one of the foregoing plastics.

Vessel 70 includes a fluid inlet 78, which receives the wet hydrogen stream from the cell stack. Preferably, fluid inlet 78 is disposed at a lower end of vessel 70, as is shown in FIG. 3, in order to eliminate or at least minimize the amount of agitation in separator 44 caused by splashing of the wet hydrogen stream as it is received into vessel 70. A check valve (not shown) may be disposed within the wet hydrogen stream to prevent the backflow of water from separator 44.

Vessel 70 further includes an overflow port 80, a vapor outlet 82, and a pressure release port 84 disposed at an upper end of separator 44. Overflow port 80 provides drainage of separator 44 in the event that vessel 70 fills completely with water and is preferably dimensioned to accommodate a flow rate that is greater than the maximum flow rate of the wet hydrogen stream into vessel 70 through fluid inlet 78. Vapor outlet 82 provides fluid communication between separator 44 and the drying apparatus and is preferably disposed as far from fluid inlet 78 as dimensionally possible to maximize the residence time of a wet hydrogen molecule within separator 44, thereby allowing the hydrogen gas maximum time to separate from the water. Pressure release port 84 provides fluid communication between separator 44 and release 50 for the rapid purge of hydrogen if the pressure exceeds a selected amount.

A liquid outlet 88 disposed at the lower end of vessel 70 enables periodic drainage to allow the water collected in the vessel to be controllably removed through valve arrangement 74, thereby being maintained at a selected level. A filter 86 is disposed at liquid outlet 88 to remove particulate matter suspended in the water collected in separator 44. Liquid outlet 88 is preferably disposed at the lowest point of separator 44 in order to effect the optimum drainage of separator 44.

In one exemplary embodiment, level sensing unit 72 comprises a level transmitting device 77 and a float 90 slidably translatable along a vertically positioned stem 93 and in informational communication with level transmitting device 77. Level transmitting device 77 is disposed in operable communication with float 90 and works in conjunction with float 90 to relay information indicative of the amount of water in vessel 70 to transducer 75. Float 90 is typically of the direct-lift type, in which the buoyant effect of the float must be greater than the force exerted on the bottom of the float that "pulls" the float. As the water level within the separator rises and falls, the position of float 90 fluctuates accordingly. Float 90 may be constructed of various materials, including metals or plastics. Metals that may be used in the construction of float 90 include stainless steel, (e.g., type 316 stainless steel), titanium, and alloys or mixtures of at least one of the foregoing metals. Plastics that may be used for the construction of float 90 include, but are not limited to, polycarbonates, polypropylenes, polyethylenes (e.g., high density polyethylene (HDPE) or ultra-high molecular weight polyethylene (UHMWPE)), and blends of at least one of the foregoing plastics. In one embodiment, the separator 44 is polycarbonate and float 90 is polypropylene.

Valve arrangement 74 is disposed in fluid communication with liquid outlet 88 and provides for the drainage of separator 44. The level of the water collected in separator 44 is maintained by the selective control of the valves of valve arrangement 74. Although valve arrangement 74 may comprise any number of valves, valve arrangement 74 generally comprises first and second valves disposed in fluid communication with each other in a parallel configuration. Optimum flow rates through each valve are functions of the orifice size of each valve.

The first valve of valve arrangement 74 is typically a high flow rate valve 92 and the second valve of valve arrangement 74 is typically a low flow rate valve 94. Each valve 92, 94 is controllable over a range of flow rates. Each valve 92, 94 is, furthermore, disposed in operable communication with transducer 75 and is independently actuatable in response to the hydrogen pressure of the system. In one exemplary embodiment of separator 44 into which valves 92, 94 are incorporated, high flow rate valve 92 provides flow rates of about 100 liters per hour (L/hr) to about 120 L/hr and preferably about 105 L/hr to about 113 L/hr, and low flow rate valve 94 provides flow rates of about 8 L/hr to about 15 L/hr and preferably about 9.3 L/hr to about 13.5 L/hr.

Informational communication and control of the drainage of separator 44 is maintained via transducer 75. A pressure output sensor/transmitter (not shown) may be incorporated into the hydrogen system to monitor the hydrogen pressure and to transmit a hydrogen system pressure signal 96 to transducer 75. The pressure output sensor/transmitter can be any suitable quantitative sensing device that converts the pressure of the hydrogen within the system to a voltage or current value (hydrogen system pressure signal 96) for measurement and is interfaced with transducer 75, which is capable of converting the voltage or current value into the pressure reading. Transducer 75, like transducer 66 described above with reference to FIG. 2, is any suitable converting device, such as an analog circuit, a digital microprocessor, or the like, capable of converting the pressure reading into a signal that can be utilized to control valve arrangement 74.

Figure 4:
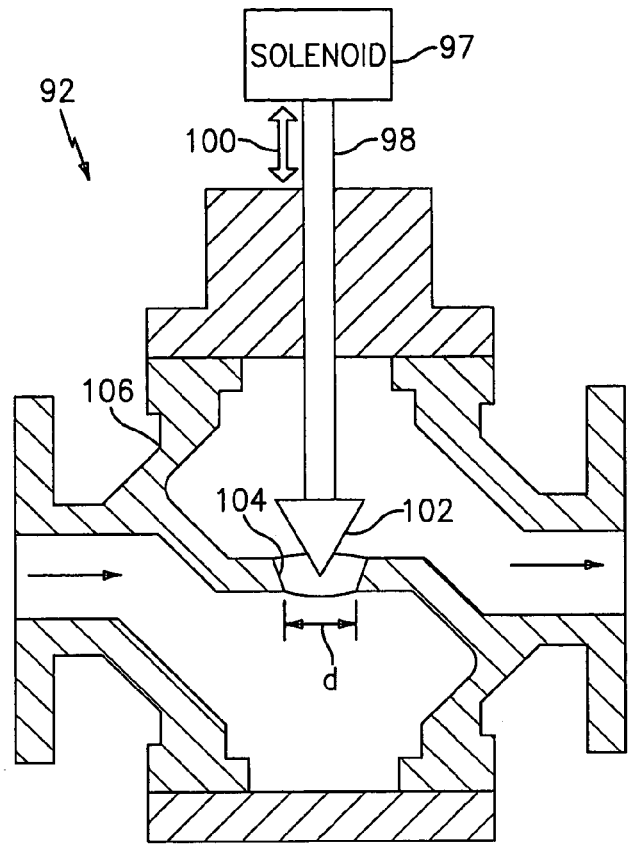
FIG. 4 is a schematic representation of a solenoid valve

Referring now to FIG. 4, an exemplary embodiment of high flow rate valve 92 is shown schematically as a globe valve. Other valve configurations that can be adapted for use as high flow rate valve 92 (as well as the low flow rate valve) include, but are not limited to, diaphragm valves, ball valves, and needle valves. High flow rate valve may be actuatable with air, with electric current, by manual articulation, or any other manner of operating a valve. High flow rate valve 92 is, however, preferably actuatable via a solenoid 97 disposed in operable communication with a valve stem 98. Solenoid 97 provides linear movement of valve stem 98 in directions indicated by a double headed arrow 100 such that a plug cock 102 disposed at valve stem 98 is received into a valve seat 104 formed or otherwise disposed within a valve body 106. Fluid communication through valve body 106 is maintained via the opening defining valve seat 104. In high flow rate valve 92, the dimension is shown as d. In the low flow rate valve (not shown) corresponding to high flow rate valve 92, the dimension defining the cross sectional area of the opening formed by the valve seat is somewhat less than d, thereby providing a correspondingly lower flow rate.

Operation of separator 44 and its valve arrangement 74 is described with reference to FIG. 3. During operation of an electrochemical cell system that includes phase separator 44 disposed in controllable communication with valve arrangement 74 through transducer 75, each valve 92, 94 is selectively operated such that water is drained from separator 44 at a rate that substantially maintains the water level at a preselected height. The selective operation of valve arrangement 74 is effected through level sensing unit 72. In particular, level sensing unit 72 senses the water level in vessel 70 and converts the water level to a signal value represented by a level signal 79. Level transmitting device 77 transmits level signal 79 to transducer 75, which, in response, retrieves hydrogen system pressure signal 96 from the system pressure sensor. The value of hydrogen system pressure signal 96 is compared to a stored value preprogrammed into transducer 75 and is further compared to level signal 79, and a logic function of transducer 75 makes a decision that ultimately determines which valve 92, 94 to open. If the decision value is the same as or greater than a setpoint value (determined during the programming of transducer 75), then low flow rate valve 94 is actuated and water is drained at a low flow rate. If the decision value is lower than the setpoint value, then high flow rate valve 92 is actuated and water is drained at a higher flow rate. Either valve 92, 94 is maintained in the actuated position (open) until float 90 drops below a pre-programmed level at which point level transmitting device 77 transmits a signal to transducer 75 that closes the operating valve.

In order to prevent the opening of valves 92, 94 in the event that separator 44 is empty of water, a shutoff feature may be incorporated into the design of level sensing unit 72. One exemplary embodiment of the shutoff feature comprises a low level transmitting device/transmitter 108 that transmits a shutoff signal 110 to transducer 75 in the event that float 90 trips low level transmitting device/transmitter 108. Shutoff signal 110 prevents opening of valves 92, 94 without operator intervention, which may comprise the tripping of a reset device (not shown).

Figure 5:
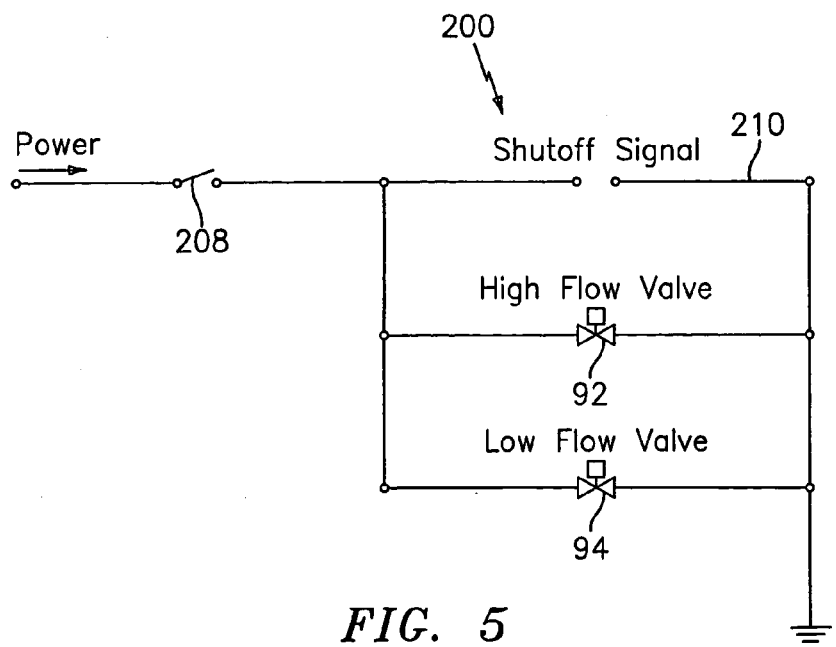
FIG. 5 is a schematic representation of an exemplary embodiment of a shutoff feature.

Referring now to FIG. 5, another exemplary embodiment of the shutoff feature is shown at 200. In shutoff feature 200, valves 92, 94 are hardwired through a shutoff signal 210. As shown, each valve 92, 94 is disposed in parallel communication with shutoff signal 210. In the event of an opening of a shutoff switch 208, power from the system is removed, thereby removing power from valves 92, 94. Because power is removed from valves 92, 94, the solenoids of valves 92, 94 are rendered inoperable.

Advantages of the valve assembly and a separator into which the valve assembly is incorporated include the enhanced control of the rate of discharge of the water during operation of the electrolysis cell system. Control of the discharge rate results in improved pressure stabilization within the separator and improved control of the water level. The shutoff feature prevents the opening of the valves when the separator is empty of water, which in turn prevents the flow of hydrogen through the liquid outlet of the separator. Furthermore, the hardwiring of the valve through the shutoff signal is a redundant feature that prevents valve actuation in the event of a failure of the electrical signal. Such a scheme further prevents the flow of hydrogen through the liquid outlet of the separator.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas/liquid phase separator, comprising:
    a fluid inlet;
    a vapor outlet;
    a liquid outlet;
    a first drainage valve disposed in fluid communication with said liquid outlet, said first drainage valve being controllable in response to a liquid level in said gas/liquid phase separator; and
    a second drainage valve disposed in fluid communication with said liquid outlet, said second drainage valve being controllable in response to said liquid level in said gas/liquid phase separator, said second drainage valve being disposed in a parallel flow configuration with said first drainage valve;
    wherein said first drainage valve and said second drainage valve are capable of receiving liquid from said liquid outlet.

2. The gas/liquid phase separator of claim 1, wherein either or both of said first drainage valve and said second drainage valve is a solenoid valve.

3. The gas/liquid phase separator of claim 1, wherein said first drainage valve is controllable over a range of flow rates of about 110 L/hr to about 120 L/hr.

4. The gas/liquid phase separator of claim 1, wherein said first drainage valve is controllable over a range of flow rates of about 105 L/hr to about 113 L/hr.

5. The gas/liquid phase separator of claim 1, wherein said second drainage valve is controllable over a range of flow rates of about 8 L/hr to about 15 L/hr.

6. The gas/liquid phase separator of claim 1, wherein said second drainage valve is controllable over a range of flow rates of about 9.3 L/hr to about 13.5 L/hr.

7. A method of controlling a liquid level in a gas/liquid phase separator, the method comprising:
    sensing an amount of liquid in said gas/liquid phase separator;
    sensing a pressure of gas in said gas/liquid phase separator; and
    selectively opening a drainage valve disposed in fluid communication with said gas/liquid phase separator to drain the liquid;
    wherein said gas/liquid phase separator comprises at least two drainage valves.

8. The method of claim 7, wherein said sensing of said amount of liquid comprises,
    determining a liquid level in said gas/liquid phase separator,
    converting said determined liquid level to a signal, and transmitting said signal to a control device.

9. The method of claim 7, wherein said selectively opening said drainage valve comprises,
    comparing said pressure of said gas with a preprogrammed stored pressure value and with said amount of liquid in said gas/liquid phase separator,
    making a decision based on the comparison of said pressure of said gas, said preprogrammed stored pressure value, and said amount of liquid,
    selecting a drainage valve based on said decision made, and
    providing a signal to said selected drainage valve.

10. The gas/liquid phase separator of claim 1, wherein the first drainage valve and the second drainage valve are controllable in response to a gas pressure.

11. A gas/liquid phase separator, comprising:
    a fluid inlet disposed near a lower end of the gas/liquid phase separator;
    a vapor outlet disposed near an upper end of the gas/liquid phase separator;
    a liquid outlet disposed near a lower end of the gas/liquid phase separator;
    a first drainage valve disposed in fluid communication with said liquid outlet, said first drainage valve being controllable in response to a pressure and a liquid level in said gas/liquid phase separator;
    a second drainage valve disposed in fluid communication with said liquid outlet, said second drainage valve being controllable in response to a pressure and a liquid level in said gas/liquid phase separator, said second drainage valve being disposed in a parallel flow configuration with said first drainage valve; and
    a level transmitting device in informational communication with a float.

12. The gas/liquid phase separator of claim 11, wherein the float is slidably translatable on a vertically positioned stem.

13. The gas/liquid phase separator of claim 11, wherein the first drainage valve is controllable over a first range of flow rates, and wherein the second drainage valve is controllable over a second range of flow rates and wherein the first range is different from the second range.

14. The method of claim 9, wherein each of said at least two drainage valves is controllable over a different flow rate range.

15. The gas/liquid phase separator of claim 11, wherein the stem further comprises a low level transmitting device.

16. The gas/liquid phase separator of claim 11, further comprising a filter disposed at the liquid outlet.

17. The method of claim 14, wherein the drainage valves are disposed in a parallel flow configuration.

18. The method of claim 7, wherein the drainage valves are disposed in a parallel flow configuration.

19. A gas/liquid phase separator, comprising:
    a fluid inlet;
    a vapor outlet;
    a liquid outlet;
    a first drainage valve for receiving liquid from said liquid outlet; and
    a second drainage valve for receiving liquid from said liquid outlet, said second drainage valve being disposed in a parallel flow configuration with said first drainage valve.

* * * * *